(12) United States Patent
Stewart

(10) Patent No.: US 9,243,947 B2
(45) Date of Patent: Jan. 26, 2016

(54) DRAIN PAN LEVEL MONITORING SYSTEM

(75) Inventor: Jeffrey L. Stewart, Whitehouse, TX (US)

(73) Assignee: Trane International Inc., Piscataway, NJ (US)

( * ) Notice: Subject to any disclaimer, the term of this patent is extended or adjusted under 35 U.S.C. 154(b) by 1431 days.

(21) Appl. No.: 12/199,479

(22) Filed: Aug. 27, 2008

(65) Prior Publication Data

US 2010/0050756 A1 Mar. 4, 2010

(51) Int. Cl.
*G01F 23/16* (2006.01)
*F24F 13/22* (2006.01)
*F24F 11/00* (2006.01)

(52) U.S. Cl.
CPC .............. *G01F 23/161* (2013.01); *F24F 13/22* (2013.01); *F24F 2011/0054* (2013.01)

(58) Field of Classification Search
CPC .. F24F 13/22; F24F 2011/0054; G01F 23/161
USPC .......................................................... 73/299
See application file for complete search history.

(56) References Cited

U.S. PATENT DOCUMENTS

| | | | |
|---|---|---|---|
| 4,937,559 A | 6/1990 | Meacham et al. | |
| 5,439,019 A * | 8/1995 | Quandt et al. | ..................... 137/2 |
| 5,854,518 A | 12/1998 | Revis | |
| 5,921,094 A | 7/1999 | Bang et al. | |
| 6,698,215 B2 | 3/2004 | Bush et al. | |
| 2002/0000093 A1* | 1/2002 | Lea | ................................ 62/150 |
| 2005/0125102 A1* | 6/2005 | Nichols et al. | ................ 700/276 |
| 2009/0229784 A1* | 9/2009 | Rohr | ............................ 165/11.1 |

* cited by examiner

*Primary Examiner* — Laura Martin
*Assistant Examiner* — Alex Devito
(74) *Attorney, Agent, or Firm* — Conley Rose, P.C.; J. Robert Brown, Jr.; Michael J. Schofield

(57) ABSTRACT

A drain pan level monitoring system of an air conditioning system comprises a level sensor that generates a level sensor output signal related to a sensed level of condensation buildup within a drain pan. A method of monitoring a liquid level buildup in a drain pan of an air handling unit comprises determining a level of liquid buildup in the drain pan and determining whether an action should be taken in response to the determined level of liquid buildup by comparing the determined level of liquid buildup to a predetermined value. A method of preventing liquid overflow of a drain pan of an air handling unit comprises monitoring a pressure related to a liquid level buildup within the drain pan and taking an action when the pressure meets a predetermined criteria.

15 Claims, 3 Drawing Sheets

DRAIN PAN LEVEL MONITORING SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

Conventional air conditioning systems generally comprise a compressor, a condenser coil, a condenser fan for passing air through the condenser coil, an evaporator coil, and an evaporator blower for passing air through the evaporator coil. The condenser coil and the evaporator coil are each designed as heat exchangers with internal tubing for carrying refrigerant. The major components of the air conditioning system can be grouped and located in different manners, but two arrangements are most prevalent.

A "split-system" is generally an air conditioning system in which the compressor, the condenser coil, and the condenser fan are colocated within a single housing, often referred to as a condensing unit. In the split-system, the evaporator coil and the evaporator blower are also collocated within a single housing, often referred to as an air handling unit or air handler. Some air handling units or air handlers comprise heat generators such as electrically resistive heating elements and/or gas furnace elements so that the evaporator coil and the heat generators are both in an airflow path of the evaporator blower. In most applications of a split-system, the condensing unit is located outside the space to be temperature controlled while the air handling unit is located within the space to be temperature controlled. More specifically, it is common for the condensing unit to be located outside the building or structure that is to be temperature controlled while the air handling unit is typically located within a closet, attic, or other location within the building.

Alternatively, a conventional air conditioning system may be configured as a "package unit" where all of the components of the air conditioning system are colocated within a single housing. Package units are typically, but not necessarily, installed in a location exterior to the space to be temperature controlled.

Regardless of the type of air conditioning system, the principles of operation remain the same. Generally, the compressor operates to compress refrigerant into a hot and high pressure gas, which is passed through the internal tubing of the condenser coil. As the refrigerant is passed through the condenser coil, the condenser fan operates to pass ambient air across the condenser coil, thereby removing heat from the refrigerant and condensing the refrigerant into liquid form. The liquid refrigerant is then delivered to the evaporator coil. Upon reaching the evaporator coil, the liquid refrigerant is passed through a flow restriction device, which causes the refrigerant to transform into a cold and low pressure gas. As the cold gas is passed through the evaporator coil, the evaporator blower passes ambient air across the evaporator coil, thereby providing a cooling and dehumidifying effect to the ambient air, which is then distributed to the space to be temperature controlled.

SUMMARY OF THE DISCLOSURE

A drain pan level monitoring system of an air conditioning system is disclosed. In some embodiments, the drain pan level monitoring system comprises a level sensor that generates a level sensor output signal related to a sensed level of condensation buildup within a drain pan.

In another aspect, the present disclosure relates to a method of monitoring a liquid level buildup in a drain pan of an air handling unit comprising determining a level of liquid buildup in the drain pan and determining whether an action should be taken in response to the determined level of liquid buildup by comparing the determined level of liquid buildup to a predetermined value.

In still another aspect, the present disclosure relates to a method of preventing liquid overflow of a drain pan of an air handling unit comprising monitoring a pressure related to a liquid level buildup within the drain pan and taking an action when the pressure meets a predetermined criteria.

BRIEF DESCRIPTION OF THE DRAWINGS

For a more detailed description of the various embodiments of the drain pan level monitoring system, reference will now be made to the accompanying drawings, wherein.

DETAILED DESCRIPTION

In some applications, air conditioning systems act to reduce the humidity of the ambient air distributed to a temperature controlled space when the air conditioning system is providing a cooling effect. This dehumidification generally occurs at the site of an evaporator coil. When the ambient air is cooled by the cold evaporator coil, the air is no longer capable of retaining its original higher amount of water vapor. Accordingly, the air is dehumidified and condensation forms on the cold evaporator coil. However, the amount of condensation formed varies greatly with evaporator coil temperature, ambient air temperature, humidity, and many other factors. While dehumidification of the air is generally desirable, the condensation that is formed must be properly disposed of to prevent damage to the air conditioning system and the surrounding area.

Specifically, most evaporator coils are associated with a drain pan into which the condensation is expected to flow. Once reaching the drain pan, the condensation is generally disposed of through a drain pipe associated with the drain pan. Unfortunately, the environments in which evaporator coils are installed are often not conducive to uninterrupted flow of condensation from the evaporator coil to the drain pan and away through the drain pipe. For example, it is common that the drain pan and drain pipe may inadvertently harbor biological growth, such as fungus or algae. Further, as an air conditioning system ages, the drain pan and/or drain pipe itself may corrode or rust, resulting in particulate matter that may obstruct the flow of condensation away from the drain pan through the drain pipe. When any obstruction to flow causes buildup of condensation within the drain pan, there exists the potential for damage to the surrounding area of the evaporator coil.

For example, where the evaporator coil is located within a residential or commercial building attic, any overflow of condensation out of the drain pan may cause damage to the structure of the attic or the building below. It is common for an overflow of condensation from a drain pan to cause damage to attic and wall insulation, building structural elements, ceilings, carpets, and other personal belongings wetted by the condensation. Some mitigation and prevention techniques to minimize risk of damage due to condensation overflow include frequent inspections of the condition of the drain pan and drain pipe, use of anti-biological growth elements within the drain pan, proper drain line trapping and sloping, use of float switches, use of audible alarms and switches, and use of secondary or backup drain pans and/or drain pipes. However, none of the above-listed mitigation and prevention techniques provide functionality for predicting a future condensation overflow problem based on the history of the condensation buildup associated with use of the evaporator coil.

Figure 1:
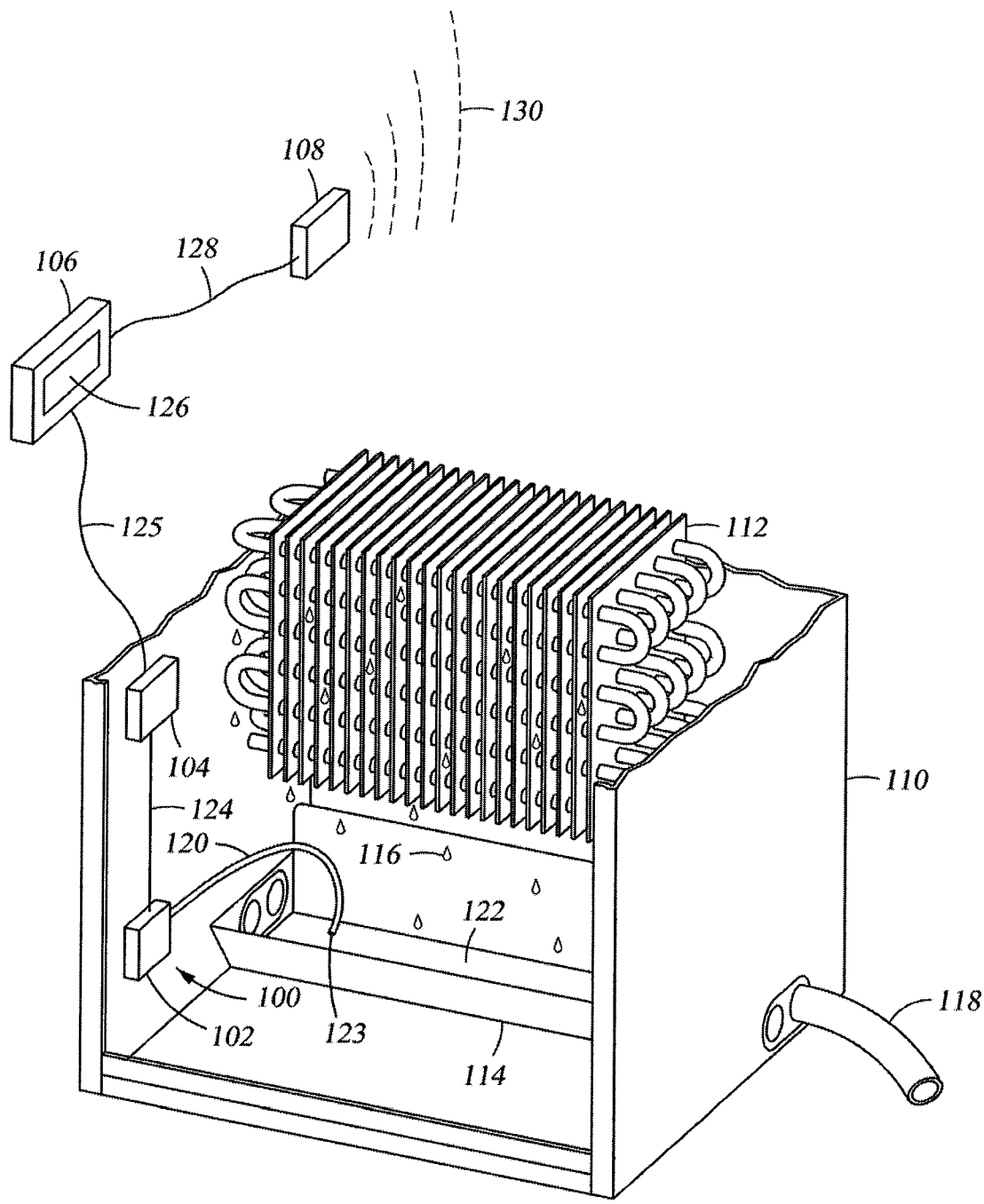
FIG. 1 is an oblique view of an embodiment of a drain pan level monitoring system.

Referring now to FIG. 1 in the drawings, a drain pan level monitoring system 100 is shown associated with an air handling unit 110 of an air conditioning system. The air handling unit 110 comprises an evaporator coil 112 and a drain pan 114 associated with the evaporator coil 112. More specifically, the drain pan 114 is located substantially below the evaporator coil 112 so that as condensation 116 is formed on and drips from the evaporator coil 112, the condensation 116 is caught by the drain pan 114 and directed toward a drain pipe 118 connected to the drain pan 114. When the air handling unit 110 is properly installed, condensation 116 is caught by drain pan 114 and flows out of the drain pan 114 through the drain pipe 118 without significant retention of condensation 116 within the drain pan 114.

The drain pan level monitoring system 100 is designed to monitor the liquid level in the drain 114 pan and comprises a level sensor 102, an air handling unit controller 104, a communicating thermostat 106, and an alert device 108. In an embodiment, the level sensor 102 and the air handling unit controller 104 of the drain pan level monitoring system 100 may be carried by the air handling unit 110 while the communicating thermostat 106 and the alert device 108 may be located remotely from the air handling unit 110. Of course, in alternative embodiments, more or fewer of the components of a drain pan level monitoring system 100 may be carried by an air handling unit 110 or may be located remotely therefrom.

In this embodiment, the level sensor 102 is a pressure transducer connected to a riser tube 120. The riser tube 120 is connected at one end to the pressure transducer and the opposing free open end 123 of the riser tube 120 is positioned at a predetermined depth within the drain pan 114, such as in this embodiment, very near a floor 122 of the drain pan 114. The free open end 123 of the riser tube 120 is located so that even a small amount of condensation 116 buildup can be sensed by the level sensor 102. In accordance with known principles in pressure measurement and related signal generation, the level sensor 102 generates a level sensor output signal that varies with changes in the depth of condensation 116 buildup relative to the free open end 123 of the riser tube 120. In other words, as condensation 116 builds up within the drain pan 114, and the condensation 116 level is raised or lowered relative to the free open end 123 of the riser tube 120, the resultant level sensor output signal changes in a predictable manner. The level sensor 102 is electrically connected to the air handling unit controller 104, in this embodiment, via a level sensor output cable 124. However, in alternative embodiments, a level sensor may be connected to an air handling unit controller using any other suitable signal transmission device or system. For example, a level sensor may be connected to an air handling unit controller using a wireless signal system or a mechanical signal transmission system.

In alternative embodiments, a level sensor may not comprise a pressure transducer, but rather, any other suitable device or system for monitoring a level of condensation buildup in a drain pan. Specifically, the level sensor may comprise, inter alia, an optical sensor, a capacitive sensor, a hall effect sensor, a resistive sensor, a potentiometer type sensor, a floating device associated with a potentiometer, or any other suitable sensing device or system.

The air handling unit controller 104 generally comprises memory, a processor, and other suitable related electronic components for receiving, storing, and comparing the level sensor output signal against predetermined values, further operation of which is discussed infra. The air handling unit controller 104 is further electrically connected to the communicating thermostat 106 via a thermostat cable 125. However, in alternative embodiments, a communicating thermostat may be connected to an air handling unit controller using any other suitable signal transmission device or system. For example, a communicating thermostat may be connected to an air handling unit controller using a wireless signal system or a mechanical signal transmission system. The air handling unit controller 104 selectively provides a controller output signal to the communicating thermostat 106 in response to the level sensor output signal from the level sensor 102.

The communicating thermostat 106 generally comprises memory, a processor, and other suitable related electronic components for receiving, storing, and comparing the controller output signal against predetermined values, further operation of which is discussed infra. The communicating thermostat 106 further comprises a visual display 126 capable of selectively displaying messages in each of alphanumeric text and static images, the messages being meaningful to the user of the air handling unit 110 or an air handling unit serviceperson. The communicating thermostat 106 is further electrically connected to an alert device 108 via an electrically conductive alert cable 128. However, in alternative embodiments, a communicating thermostat may be connected to an alert device using any other suitable signal transmission device or system. For example, a communicating thermostat may be connected to an alert device using a wireless signal system or a mechanical signal transmission system. The communicating thermostat 106 selectively generates an alert signal in response to the controller output signal from the air handling controller unit 104. The alert signal is carried to the alert device 108 via the alert cable 128.

The alert device 108, in this embodiment, is a wireless communication device programmed to contact a predetermined air handling unit serviceperson in response to receiving the alert signal from the communicating thermostat 106. Activation of the alert device 108 initiates the transmission of wireless communication signals 130 that ultimately carry information for placing the predetermined air handling unit serviceperson on alert with regard to the service needs associated with the air handling unit 110 as indicated by the drain pan level monitoring system 100. In alternative embodiments, an alert device may comprise any combination of alert components and/or systems. Specifically, the alert device may comprise an audible alert system, a visual alert system, a computer alert system programmed to send email or cell phone alerts, any suitable wired or wireless communication system, a system capable of communicating the global positioning system coordinates associated with the air handling unit 110, or any other component or system suitable for communicating or signaling a condition of the air handling unit 110 or the air conditioning system generally.

Figure 2:
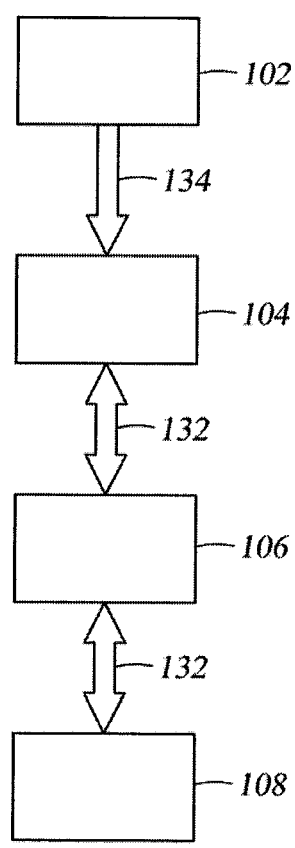
FIG. 2 is a schematic diagram of an embodiment of communication architecture for the drain pan level monitoring system of FIG. 1.

Referring now to FIG. 2 in the drawings, a schematic diagram of the communication architecture of the drain pan level monitoring system 100 is shown. It is important to note that each of the air handling unit controller 104, communicating thermostat 106, and alert device 108 are configured for bidirectional communication among the three components as indicated by bidirectional communication paths 132. This bidirectional communication feature enables communicative passivity and redundancy through the communication architecture so that should one of the three components 104, 106, 108 not fully perform its intended function, one of the remaining components can provide a backup functionality to alternatively serve the failed functionality of the failed component. In this embodiment, the level sensor 102 is configured to communicate in a unidirectional manner as indicated by the unidirectional communication path 134, however, alternative embodiments of a drain pan level monitoring system 100 may optionally include a level sensor configured for bidirectional communication.

Figure 3:
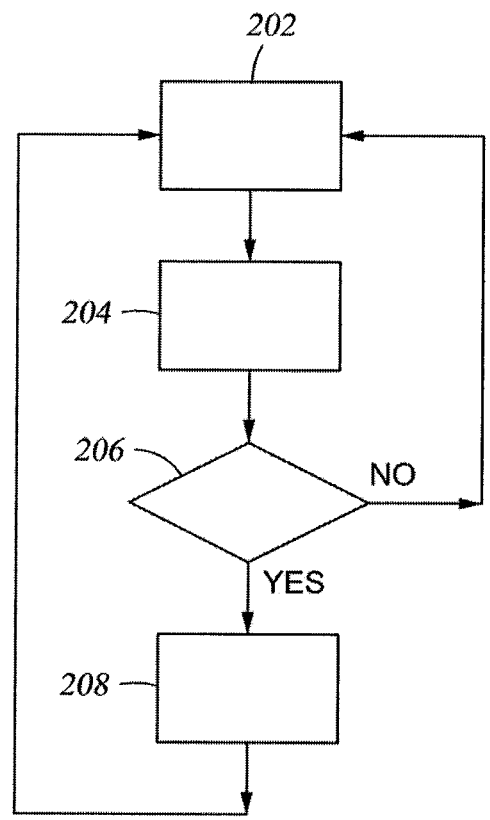
FIG. 3 is a flowchart of an embodiment of a logical process performed by the drain pan level monitoring of FIG. 1.

Referring now to FIG. 3 in the drawings, a flowchart of one embodiment of a logical process 200 that may be performed by the drain pan level monitoring system 100 is shown. In general, the process 200 comprises the level sensor 102, the air handling unit controller 104, the communicating thermostat 106, and the alert device 108 monitoring the level of condensation 116 buildup within the drain pan 114 so that when one of two conditions are met, an action is ultimately taken. Specifically, the process 200 comprises determining the level of condensation 116 buildup in the drain pan 114 at step 202 in FIG. 3. At step 204, the drain pan level monitoring system 100 optionally stores the determined level of condensation 116 buildup for future reference and use. At step 206, the drain pan level monitoring system 100 determines whether any action should be taken in response to the level of condensation 116 buildup determined at step 202. If the answer at step 206 is "NO," that according to predetermined programming no action should be taken, then the drain pan level monitoring system 100 generally returns back to step 202 and monitors the level of condensation 116 buildup in the drain pan 114. If the answer at step 206 is "YES," that according to predetermined programming an action should be taken in response to the level of condensation 116 buildup determined at step 202, then the drain pan level monitoring system 100 takes an action at step 208. After taking action at step 208, the drain pan level monitoring system 100 generally returns to the step 202 of monitoring the level of condensation 116 buildup in the drain pan 114.

In this embodiment of logical process 200 performed by the drain pan level monitoring system 100, the step 202 of determining the level of condensation 116 buildup in the drain pan 114 is accomplished by the air handling unit controller 104 repeatedly polling or sampling the level sensor output signal over very short intervals of time. However, in alternative embodiments, the level sensor and the air handling unit controller may be configured to monitor the level sensor output signal differently, namely, either substantially continuously or with different time intervals between pollings or samplings. Further, in alternative embodiments, the pollings or samplings of the level sensor output signal may not be uniform. In other words, the level sensor output may be monitored at irregular intervals, at intervals according to an arithmetic equation, or at intervals dependent upon previous pollings or samplings of the level sensor output. Still further, in other embodiments, the level sensor may not provide a substantially continuous level sensor output signal. Instead, the level sensor itself may only intermittently generate or provide a level sensor output signal. When the level sensor only intermittently generates or provides a level sensor output signal, the air handling unit controller may continuously monitor or listen for the level sensor output signal rather than polling for or sampling for the signal at time separated intervals.

Further, in this embodiment of logical process 200 performed by the drain pan level monitoring system 100, step 204 involves writing or storing the value of the level of condensation 116 buildup in the drain pan 114 determined at step 202 to the memory of the air handling unit controller 104. However, in alternative embodiments, the value of the level of condensation buildup in a drain pan determined may be stored in any one or more of a level sensor, an air handling unit controller, a communicating thermostat, an alert device, or any device or system communicated with by the drain pan level monitoring system.

In this embodiment of logical process 200 performed by the drain pan level monitoring system 100, the step 206 of determining whether an action should be taken involves answering two logical questions. A first question to be answered is whether the value of the level of condensation 116 buildup in the drain pan 114 determined at step 202 has met or exceeded a predetermined level of buildup that warrants an immediate action to be taken. For example, the predetermined level of buildup may be a level at which condensation 116 buildup is dangerously close to overflowing the drain pan 114 and potentially causing damage to the surroundings of the air handling unit 110. A second question to be answered is whether the value of the level of condensation 116 buildup in the drain pan 114 determined at step 202 provided the information necessary to determine that, over time, a trend in drain pan 114 condensation 116 buildup levels has been determined to be potentially harmful, thereby warranting an action to be taken. It will be appreciated that the trend in drain pan 114 condensation 116 buildup levels may represent a trend over any length of time, including from a very short or nearly instantaneous period of time, such as a rate of change in condensation 116 buildup over only a second or less, to a very long period of time, such as a rate of change in condensation 116 buildup over a duration of up to multiple years. In this embodiment, if either the actual level of condensation 116 buildup is potentially harmful or if the most recently determined level of condensation 116 buildup is sufficient to meet the conditions of a monitored type of trend in buildup levels, action is taken in the subsequent step 208. In this embodiment, the logical calculations and determinations required to make the decision of whether action is necessary is performed by the air handling unit controller 104. However, in alternative embodiments, any one or combination of a level sensor, an air handling unit controller, a communicating thermostat, an alert device, or any device or system communicated with by the drain pan level monitoring system may be used to determine such decisions, including manual interaction between the system and a user and/or serviceperson.

In this embodiment, the action taken at step 208 depends on which reason an action has been deemed necessary. Specifically, if the action is to be taken in response to the actual level of condensation 116 buildup being potentially harmful, the action taken includes both the system 100 performing an emergency shutdown of the air handling unit 110 and a wireless communication signal 130 being generated to notify a predetermined serviceperson of the need for service. In this embodiment, the air handling unit 110 is prevented from starting up until the condensation 116 buildup no longer exceeds the predetermined level that is indicative of potential harm. Of course, in alternative embodiments, the drain pan level monitoring system may be configured to selectively allow running of an air handling unit in spite of the known danger of overflow, and the system may be configured to contact a plurality of recipients via the wireless communication signal.

If the action to be taken at step 208 is in response to the level of condensation 116 buildup being such that the level contributes to a trend of inappropriate increasing buildup over time, the action to be taken is simply a warning or alert communicated via the wireless communication signal 130 in a manner similar to that described above. In this case, the air handling unit 110 is allowed to continue to operate unless and until the system 100 later determines that the condensation 116 buildup exceeds the predetermined amount of buildup that is potentially harmful as described above with regard to the emergency shutdown of the air handling unit 110.

Regardless the cause of the action to be taken at step 208, the condition of the air handling unit 110 is communicated to the user and others at least visually through the use of the visual display 126 of the communicating thermostat 106. Of course, in alternative embodiments, a plurality of devices for communicating the status of an air handling unit and the associated condensation buildup may be used. Specifically, any suitable alert device (which may alternatively be integral to any of a level sensor, an air handling unit controller, or a communicating thermostat) may be used to communicate the status of an air handling unit and the associated condensation buildup.

In an alternative embodiment of a logical process that may be performed, a drain pan level monitoring system could be used to provide feedback to an air handling unit installer about whether the drain pan has been properly leveled. In this logical process, the step of determining the level of condensation buildup could be performed by a plurality of level sensors determining the level of condensation buildup at various locations within the drain pan. In the next step, the multiple level values from different locations within the drain pan could optionally be stored in memory for future reference. Next, during the step of determining if an action should be taken, the multiple level values could be evaluated to determine if these values have an acceptable relationship, i.e., a relationship that indicates the drain pan is appropriately leveled. If the level values do not have an acceptable relationship, an action could be taken in the next step to indicate that the drain pan is not properly leveled.

In another alternative embodiment of a logical process that may be performed, a drain pan level monitoring system could be used to provide feedback to an air handling unit installer about whether the drain pipe is properly sloped. This could be accomplished by alternatingly repeating the steps of determining the level of condensation buildup in the drain pan and storing the level values over a period of time before determining if an action should be taken. Then, when determining if an action should be taken, the resulting stored level values could be used to compute a rate of fluid flow from the drain pan through the drain pipe, and the computed rate could then be compared to predetermined acceptable rates of fluid flow to determine if the computed rate is acceptable. If the computed rate of fluid flow is not acceptable, an action could be taken in the next step to indicate that the drain pipe is not properly sloped.

In cases where an air handling unit is installed in a configuration where gravity is insufficient to cause drainage of condensation from a drain pan, such as where the outlet of the drain pipe is higher than the inlet of the drain pipe, a condensation pump may be used to forcibly transport liquid out of the drain pan against gravitational forces. In still another alternative embodiment of a logical process that may be performed, a drain pan level monitoring system may be used to determine when to activate and deactivate a condensation pump. In this logical process, a level of condensation buildup is determined and may be stored in memory for later reference. Next, in the step of determining whether an action should be taken, the level value is compared to a predetermined threshold value. If the determined level value is greater than the predetermined threshold value, the step of taking an action could include activating a condensation pump to remove liquid from the drain pan. Next, and while the condensation pump is still activated, the logical steps would be repeated so that the condensation pump remains activated until the most recently determined level value is equal to or less than the predetermined threshold value.

In some cases, debris from the environment around an air handling unit may inadvertently be introduced to the drain pan or drain pipe. In yet another alternative embodiment of a logical process that may be performed, a drain pan level monitoring system may be used to determine whether there is debris in the drain pan or drain pipe. In such a process, a current level of condensation buildup is compared against historical data, with monitoring taking place from the time when the air handling unit is installed or after the air handling unit has been running for a predetermined period of time. Specifically, a later determined condensation buildup level while the air handling unit is not operating that is higher than an earlier determined condensation buildup level while the air handling unit was not operating may indicate the presence of debris in the drain pan or the drain pipe.

In this embodiment, a level of condensation buildup is first determined while the air handling unit is not operating and during a timeframe soon after the air handling unit is newly installed or otherwise does not have debris in the drain pan or drain pipe. In the next step, the determined buildup level value is stored. In this embodiment, the step of determining whether an action should be taken is not performed initially because no historical condensation buildup level values exist against which to compare the current buildup level value. Consequently, the step of taking an action is also not taken initially, but rather, the sequence repeats back to the step of determining a level of condensation buildup. After the air handling unit has cycled on and then cycled off, and while the air handling unit is not operating, the steps of determining a level of condensation buildup and storing the determined buildup level are again performed. Next, to determine whether an action should be taken, the first determined and stored buildup level value is compared to the most recently determined and stored buildup level value. If the most recently determined buildup level value is higher than the first determined buildup level value by a predetermined amount, an action is taken. The step of taking an action may include indicating that there may be a buildup of debris in the drain pan and/or the drain pipe.

Figure 4:
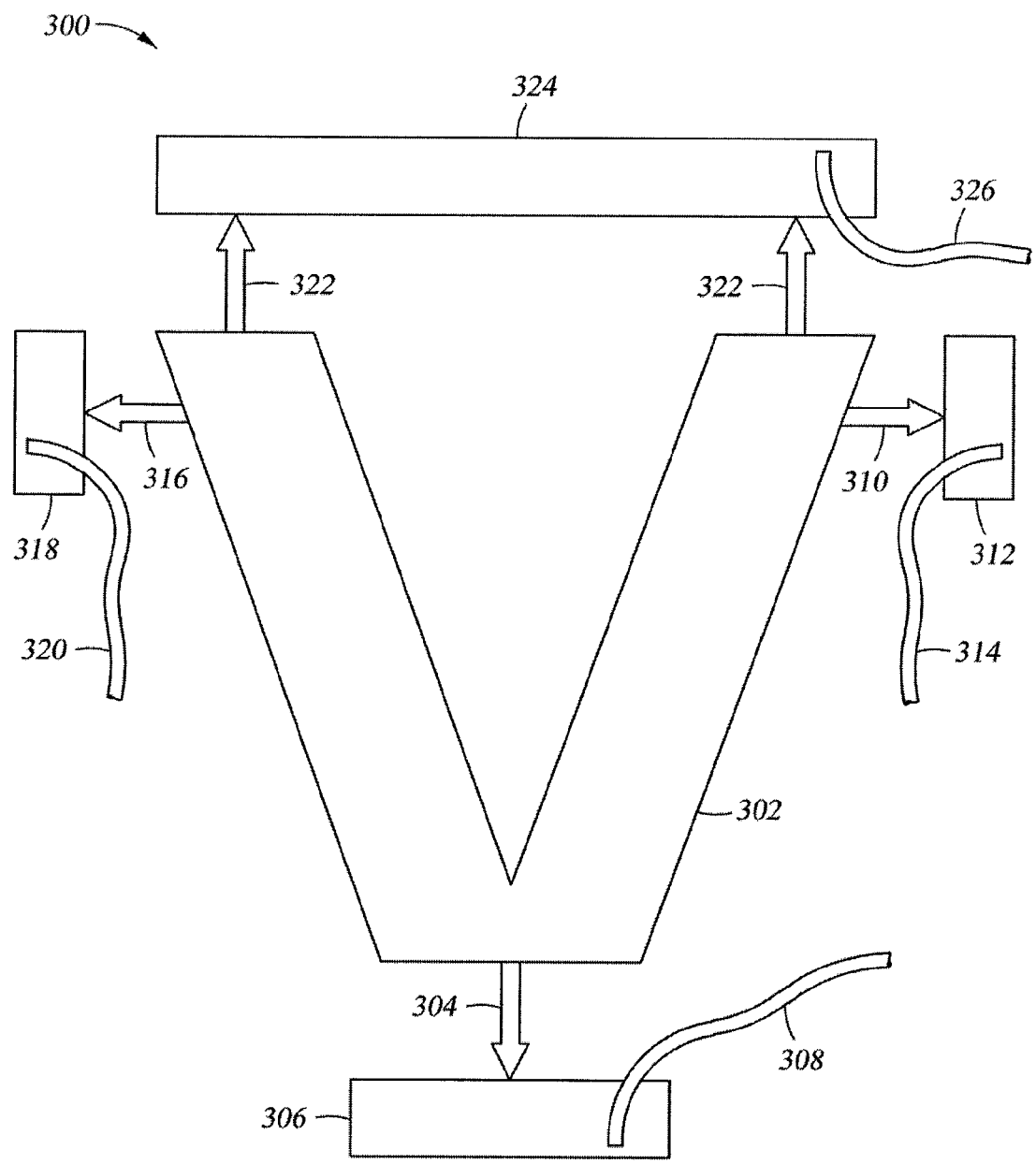
FIG. 4 is a simplified schematic diagram of a convertible air handling unit having a drain pan level monitoring system substantially similar to the drain pan level monitoring system of FIG. 1.

Referring now to FIG. 4, a simplified schematic diagram of a convertible air handling unit 300 is shown. Convertible air handling unit 300 comprises a V-shaped evaporator coil 302 that is well suited for being physically oriented in at least four different positions when installed. As illustrated, the vertex of the V-shaped evaporator coil 302 is located at a lowermost position so that condensation would flow generally in the direction indicated by the arrow 304 into bottom drain pan 306. With a drain pan level monitoring system substantially similar to drain pan level monitoring system 100 associated with the evaporator coil 302, the level sensor of that drain pan level monitoring system would monitor the condensation buildup in the bottom drain pan 306 using the riser tube 308 as shown.

Alternatively, if the convertible air handling unit 300 were oriented differently with the right side of the evaporator coil 302 being located in a lowermost position (as the air handling unit 300 would appear by rotating the drawing clockwise by 90° from the shown orientation), condensation would flow generally in the direction indicated by the arrow 310 into right drain pan 312. In this case, the level sensor of the drain pan level monitoring system would monitor the condensation buildup in the right drain pan 312 using the riser tube 314 as shown.

Alternatively, if the convertible air handling unit 300 were oriented differently with the left side of the evaporator coil 302 being located in a lowermost position (as the air handling unit 300 would appear by rotating the drawing counter-clockwise by 90° from the shown orientation), condensation would flow generally in the direction indicated by the arrow 316 into left drain pan 318. In this case, the level sensor of the drain pan level monitoring system would monitor the condensation buildup in the left drain pan 318 using the riser tube 320 as shown.

Alternatively, if the convertible air handling unit 300 were oriented differently with the upper side of the evaporator coil 302 being located in a lowermost position (as the air handling unit 300 would appear by rotating the drawing 180° from the shown orientation), condensation would flow generally in the direction indicated by the arrows 322 into upper drain pan 324. In this case, the level sensor of the drain pan level monitoring system would monitor the condensation buildup in the upper drain pan 324 using the riser tube 326 as shown.

While FIG. 4 shows the convertible air handling unit 300 having multiple riser tubes 308, 314, 320, 326, such display of multiple riser tubes is only for the purpose of demonstrating the ease with which a drain pan level monitoring system can be adapted for different air handling unit installation orientations. Namely, as installed, the convertible air handling unit 300 would comprise a single riser tube that is attached to whichever drain pan happens to be located in the lowermost position.

As evinced by the discussion above, the various embodiments of drain pan level monitoring systems and logical processes that may be performed by such systems provide the ability to predict a possible impending overflow of condensation within a drain pan of an air handling unit; to provide warnings, indications, notifications, and/or alerts that such an overflow may be impending; and to mitigate and/or prevent condensation overflow from a drain pan, among other capabilities. Some of these features result from the ability of the drain pan level monitoring systems to substantially continuously or intermittently determine the level of condensation buildup in the drain pan rather than using a simple liquid level switch, such as a float switch, that only activates when the level of condensation buildup reaches a setpoint value.

While various embodiments of the drain pan level monitoring system and logical processes that may be performed by such systems have been shown and described, modifications thereof can be made by one skilled in the art without departing from the spirit or teaching of this disclosure. The embodiments described herein are representative only and are not limiting. Many variations and modifications of the apparatus and methods are possible and are within the scope of the disclosure. Accordingly, the scope of protection is not limited to the embodiments described herein, but is only limited by the claims that follow, the scope of which shall include all equivalents of the subject matter of the claims.

What is claimed is:

1. A drain pan level monitoring system of an air conditioning system, comprising:
   a level sensor that generates (1) a first level sensor output signal related to a first positive value rate of condensation buildup within a drain pan and (2) a second level sensor output signal related to a second positive value rate of condensation buildup within the drain pan, wherein the level sensor is configured to generate the first level sensor output signal prior to generating the second level sensor output signal; and
   an alert device configured to indicate that there may be a buildup of debris in the drain pan if a value of the second positive value rate is greater than a value of the first positive value rate by a predetermined amount.

2. The drain pan level monitoring system according to claim 1, wherein the level sensor comprises a pressure transducer.

3. The drain pan level monitoring system according to claim 1, wherein the level sensor substantially continuously generates a level sensor output signal.

4. The drain pan level monitoring system according to claim 1, wherein the level sensor intermittently generates a level sensor output signal.

5. The drain pan level monitoring system according to claim 1, further comprising:
   memory for storing a value of the level sensor output signal.

6. The drain pan level monitoring system according to claim 1, further comprising:
   an air handling unit controller in communication with the level sensor and receiving the level sensor output signal.

7. The drain pan level monitoring system according to claim 6, wherein the air handling unit controller substantially continuously receives the level sensor output signal.

8. The drain pan level monitoring system according to claim 6, wherein the air handling unit controller intermittently receives the level sensor output signal.

9. The drain pan level monitoring system according to claim 6, further comprising:
   a communicating thermostat in communication with the air handling unit controller.

10. A method of monitoring a liquid level buildup in a drain pan of an air handling unit, comprising:
    determining a first positive value rate of liquid buildup in the drain pan;
    storing the first positive value rate of liquid buildup to a memory;
    operating the air handling unit;
    ceasing operation of the air handling unit;
    after determining the first positive value rate of liquid buildup in the drain pan, determining a second positive value rate of liquid buildup in the drain pan after the ceasing operation of the air handling unit; and
    performing an action if the second positive value rate of liquid buildup is greater than the first positive value rate of liquid build up by more than a predetermined amount.

11. The method according to claim 10, wherein the action performed is shutting off the air handling unit.

12. The method according to claim 10, wherein the action performed is activating a condensation pump associated with the drain pan.

13. A method of preventing liquid overflow of a drain pan of an air handling unit, comprising:
    monitoring rates of liquid level buildup within the drain pan;
    taking an action when at least one of the rates meets a predetermined criteria;
    wherein the predetermined criteria comprises determining that a first positive rate value measured is less than a second positive rate value that is measured after the first positive rate value is measured, wherein the air handling unit is operated between the measuring of the first positive rate value and the measuring of the second positive rate value.

14. The method according to claim 13, wherein the action taken is shutting down the air handling unit, activating an alert device, or both.

15. The method according to claim 13, further comprising:
retaining a value of at least one of the first positive rate value and the second positive rate value for later reference.

* * * * *